Figure 1:
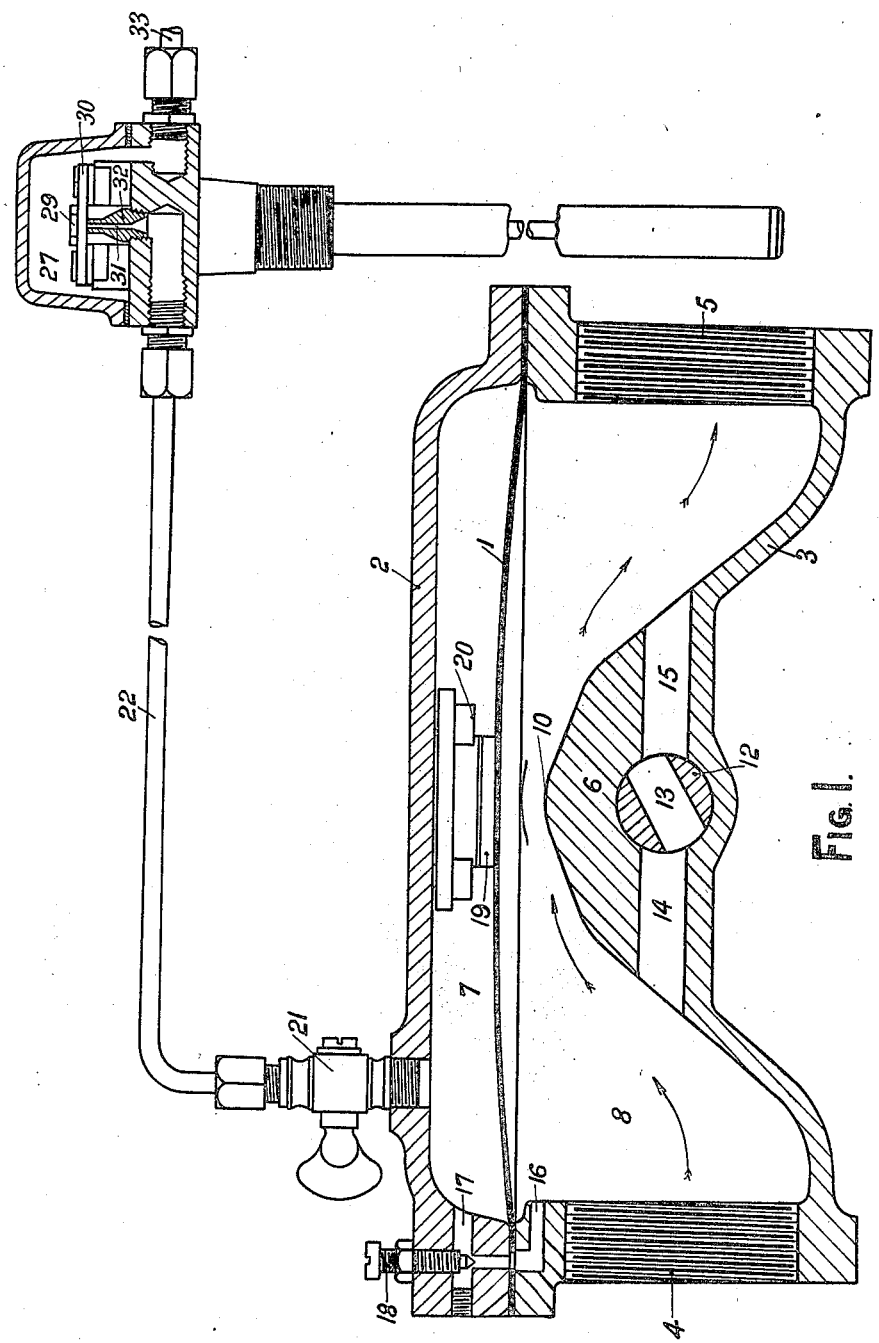

Oct. 1, 1929.　　　　G. KEITH　　　　1,730,150
RELAY CONTROL VALVE
Filed Jan. 11, 1928　　　2 Sheets-Sheet 1

Inventor
George Keith
By Pennie, Davis, Marvin and
Attorneys

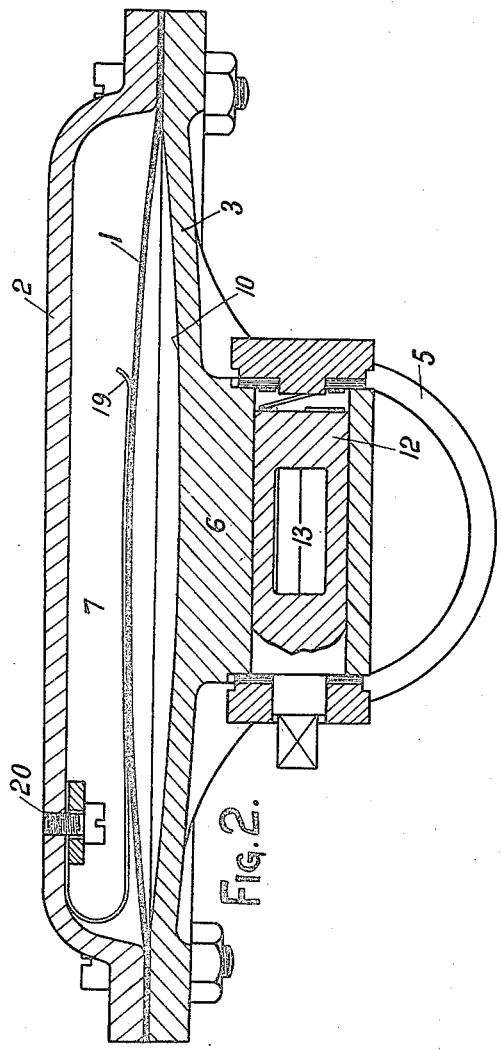

Patented Oct. 1, 1929

1,730,150

UNITED STATES PATENT OFFICE

GEORGE KEITH, OF LONDON, ENGLAND, ASSIGNOR, BY MESNE ASSIGNMENTS, TO THE SURFACE COMBUSTION COMPANY, INC., OF NEW YORK, N. Y., A CORPORATION OF NEW YORK

RELAY CONTROL VALVE

Application filed January 11, 1928. Serial No. 245,973.

This invention relates to a relay control valve responsive to the operation of an automatic device acting on a pilot valve which controls a branch connection from the regulating device and adapted to close the pilot valve when a predetermined temperature is exceeded.

A construction according to the present invention includes a diaphragm casing partitioned into two compartments by a flexible diaphragm, one of which compartments, say the lower compartment, is provided with a fluid inlet and a fluid outlet aligned therewith, through which fluid air or gas for supply to gas burners passes to the point of consumption, and a ridged member intermediate said inlet and outlet and defining with the diaphragm an approximately stream-line fluid passage free from abrupt bends or turns, the crest of the ridge presenting a seat engageable by the diaphragm to close the passage.

A controlled port in the wall of the casing, open to the fluid inlet side connects said inlet side to the other compartment, i. e., in the given case the upper compartment, of the casing, whereby a predetermined quantity of fluid is allowed to pass to said upper compartment which latter is connected with a point of low pressure located beyond the outlet of the diaphragm casing by a passage in which is interposed the pilot valve aforesaid.

In operation, with the pilot valve open, the fluid pressure on the underside of the diaphragm suffices to hold the diaphragm unseated, the fluid (air or gas) flowing with but slight resistance through the passage connecting the inlet to the outlet, such fluid as percolates through the controlled port to the upper compartment of the diaphragm casing finding its way past the pilot valve to a point of low pressure which may be the atmosphere.

On attainment of excessive temperature or other predetermined conditions a thermostat or other automatic device operates to close the pilot valve so that leakage fluid passing through the controlled port accumulates on the upper side of the diaphragm, whereby with the increase of pressure on that side the diaphragm is caused to seat itself and cut off communication between the inlet and the outlet; a spring fitted to the casing on the upper side of the diaphragm and stressed in the fully unseated position of the diaphragm serving to impart the initial closing movement to the diaphragm, but the main closing effort being due to the difference of pressure between the upper side of the diaphragm and that portion of the underside of the diaphragm beyond the ridge.

When the pilot valve is reopened, the diaphragm again unseats itself, as will be understood.

A by-pass valve or cock may be fitted to the ridged member between the fluid inlet and the outlet to ensure that in the seated position of the diaphragm sufficient fluid will pass to the outlet to prevent the burners from being extinguished.

In the accompanying drawings which illustrate an apparatus according to the invention Figs. 1 and 2 are vertical sections at right angles to one another.

As shown, 1 denotes a flexible diaphragm interposed between a cover 2 and a body or casing member 3. The body 3 is formed with aligned inlet and outlet openings 4, 5 between which is interposed a ridged member 6 presenting gently sloping sides. There is thus formed between the cover 2 and the diaphragm 1 a compartment 7 and between said diaphragm and the body 3, a compartment 8, divided by the ridge 6, the crest 10 of the ridge forming a seat, the disposition and formation of the ridge member being such that in the unseated position of the diaphragm there is presented a through passage for fluid passing from the inlet 4 to the outlet 5 conforming approximately to the stream lines.

Fitted to the ridge member is a rotatable plug 12 having a port 13 adapted to connect apertures 14, 15 formed in said ridge member whereby to control a by-pass that allows a limited quantity of fluid to pass to the outlet—sufficient to ensure that the burners may be maintained alight, even when the diaphragm is seated.

A port 16 formed in the wall of the body 3 permits fluid to pass from the compartment 8 to the compartment 7 by way of a port 17 in the wall of the cover, such passage being controlled by an externally adjustable needle valve 18.

A cantilever leaf spring 19 anchored at 20 to the cover 2 and extending diametrically across the upper surface of diaphragm 1 is adapted to be stressed in the final stage of the upward movement of the diaphragm.

Connected to the compartment 7 by way of a cock 21 and a by-pass pipe connection 22 is a chamber 27 in which is housed a lever 30 fitted with a valve 29 and operated in known manner by a thermostat to control a port 31 in a nipple 32 leading to an outlet connection 33 leading to a point of low pressure.

In operation, a predetermined quantity of fluid passes from the inlet 8 to the compartment 7 by way of the ports 16, 17; so long as the temperature is below a predetermined limit, this fluid is by-passed to a point beyond the outlet 5 whereby the building up of pressure in the compartment 7 above the diaphragm 1 is prevented.

When by the operation of the thermostat the valve disc 29 is caused to close the passage 31, pressure is built up in the compartment 7 whereby the diaphragm 1 is urged on its seat 10, receiving an initial impulse from the spring 19, and in consequence the passage of fluid to the outlet 5 is cut off save for what finds its way through the by-pass 14, 13, 15.

I claim:

1. In a relay control valve, mechanism comprising a casing, a cover for said casing, a flexible diaphragm between said casing and said cover, affording upper and lower compartments on opposite sides of said diaphragm, said casing having aligned inlet and outlet openings and an intermediate ridge member having a seat-forming crest, said diaphragm and said casing defining in the unseated position of said diaphragm a straight-through passage for fluid flowing from said inlet to said outlet opening, said ridge member being traversed by a by-pass, the wall of said casing being formed with a port between said inlet opening and said ridge member, and said cover being formed with a port in communication with said first mentioned port, affording a passageway between said compartments, a valve controlling said passage-way, and a spring in said upper compartment, said spring being adapted to be stressed in the final stage of movement of said diaphragm in the direction away from said crest.

2. In a relay control valve, mechanism comprising, with a casing, a cover for said casing, a flexible diaphragm between said casing and said cover, affording upper and lower compartments on opposite sides of said diaphragm, said casing having aligned inlet and outlet openings and an intermediate ridge member having a seat-forming crest and formed with a through aperture, said diaphragm and said casing defining in the unseated position of said diaphragm a straight-through passage for fluid flowing from said inlet to said outlet opening, the wall of said casing having a port between said inlet opening and said ridge member and said cover having a port in communication with said first mentioned port, affording a passageway between said compartments, a valve controlling said passageway, a spring in said upper compartment, said spring being adapted to be stressed in the final stages of movement of said diaphragm in the direction away from said crest, and a ported plug controlling said aperture through said seat-forming crest.

3. In a relay control valve, mechanism comprising, a casing, a cover for said casing, a flexible diaphragm between said casing and said cover, affording upper and lower compartments on opposite sides of said diaphragm, said casing having aligned inlet and outlet openings and an intermediate ridge member having a seat-forming crest, said diaphragm and said casing defining in the unseated position of said diaphragm an approximately stream lined passage free from abrupt turns from said inlet to said outlet opening, the wall of said casing being formed with a port between said inlet opening and said ridge member, and said cover being formed with a port in communication with said first mentioned port, affording a passageway between said compartments, a valve controlling said passageway, and a blade spring in said upper compartment, said spring being adapted to be stressed in the final stage of movement of said diaphragm in the direction away from said crest.

In testimony whereof I have signed my name to this specification.

GEORGE KEITH.